(12) United States Patent
Gohier

(10) Patent No.: US 9,620,774 B2
(45) Date of Patent: Apr. 11, 2017

(54) METHOD OF MANUFACTURING AN ELECTRODE, CORRESPONDING ELECTRODE AND BATTERY COMPRISING SUCH AN ELECTRODE

(71) Applicant: RENAULT s.a.s., Boulogne-Billancourt (FR)

(72) Inventor: Aurelien Gohier, Antony (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 33 days.

(21) Appl. No.: 14/403,251

(22) PCT Filed: May 24, 2013

(86) PCT No.: PCT/FR2013/051149
§ 371 (c)(1),
(2) Date: Jan. 28, 2015

(87) PCT Pub. No.: WO2013/175143
PCT Pub. Date: Nov. 28, 2013

(65) Prior Publication Data
US 2015/0140436 A1    May 21, 2015

(30) Foreign Application Priority Data
May 25, 2012 (FR) .................................. 12 54867

(51) Int. Cl.
*H01M 4/36* (2006.01)
*H01M 4/04* (2006.01)
(Continued)

(52) U.S. Cl.
CPC ............ *H01M 4/366* (2013.01); *H01M 4/04* (2013.01); *H01M 4/0419* (2013.01);
(Continued)

(58) Field of Classification Search
None
See application file for complete search history.

(56) References Cited

U.S. PATENT DOCUMENTS

| 2007/0148962 A1 | 6/2007 | Kauppinen et al. |
| 2011/0151335 A1* | 6/2011 | Deromelaere ........ H01M 4/136 |
| | | 429/304 |

(Continued)

FOREIGN PATENT DOCUMENTS

| DE | WO 2012/001152 | * 1/2012 | ............. H01M 4/62 |
| WO | 2005 085130 | 9/2005 | |
| WO | 2011 149958 | 12/2011 | |

OTHER PUBLICATIONS

French Search Report Issued Jan. 28, 2013 in Application No. FR 1254867 Filed May 25, 2012.
(Continued)

*Primary Examiner* — Yoshitoshi Takeuchi
(74) *Attorney, Agent, or Firm* — Oblon, McClelland, Maier & Neustadt, L.L.P.

(57) ABSTRACT

A method of manufacturing an electrode, including: a) depositing catalytic growth seeds on an electrically conducting support by aerosol spraying, b) growth of oriented carbon nanotubes on the basis of the deposition of the catalytic growth seeds, c) a deposition of sulphur on the oriented carbon nanotubes formed in b), and d) a deposition of a layer of carbon on the sulphur. An electrode, as well as to a battery including such an electrode, includes an electrically conducting support and oriented carbon nanotubes disposed on the surface of the electrically conducting support and covered at least partly by sulphur, the oriented carbon nanotubes exhibiting a length of greater than 20 μm, or greater than 50 μm.

4 Claims, 5 Drawing Sheets

Figure 1:
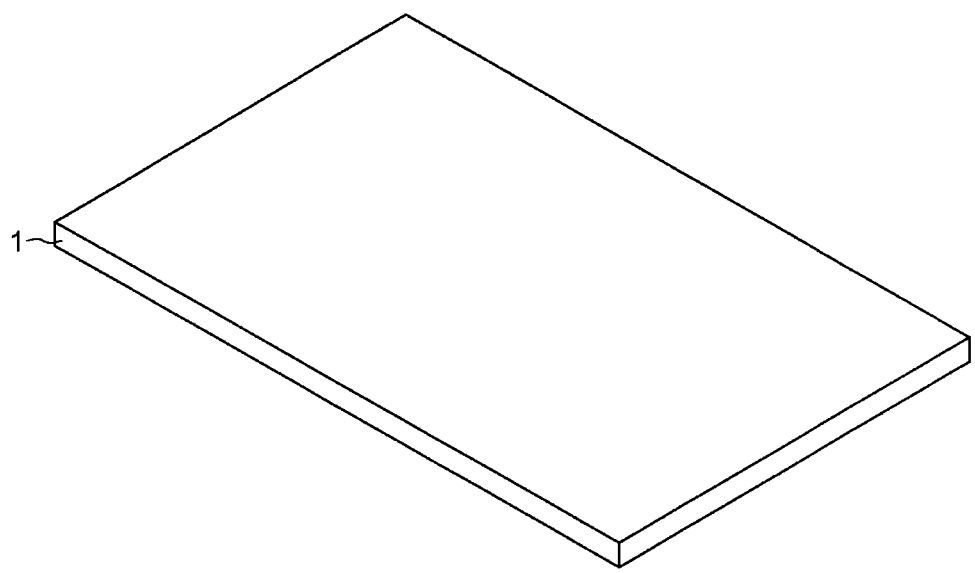

(51) Int. Cl.
| | |
|---|---|
| H01M 4/13 | (2010.01) |
| H01M 4/139 | (2010.01) |
| H01M 4/38 | (2006.01) |
| H01M 4/66 | (2006.01) |
| H01M 4/70 | (2006.01) |
| H01M 10/052 | (2010.01) |
| H01M 10/0525 | (2010.01) |
| H01M 4/88 | (2006.01) |
| H01M 4/1393 | (2010.01) |

(52) U.S. Cl.
CPC ....... *H01M 4/0421* (2013.01); *H01M 4/0428* (2013.01); *H01M 4/0471* (2013.01); *H01M 4/0483* (2013.01); *H01M 4/13* (2013.01); *H01M 4/139* (2013.01); *H01M 4/1393* (2013.01); *H01M 4/38* (2013.01); *H01M 4/661* (2013.01); *H01M 4/663* (2013.01); *H01M 4/667* (2013.01); *H01M 4/70* (2013.01); *H01M 4/88* (2013.01); *H01M 10/052* (2013.01); *H01M 10/0525* (2013.01); H01M 4/8867 (2013.01); H01M 2220/20 (2013.01); *Y02P 70/54* (2015.11); *Y02T 10/7011* (2013.01)

(56) References Cited

U.S. PATENT DOCUMENTS

2011/0262807 A1   10/2011   Boren et al.
2013/0202961 A1*  8/2013   Hagen ................ H01M 4/0404
                                                            429/211

OTHER PUBLICATIONS

International Search Report Issued Aug. 19, 2013 in PCT/FR13/051149 Filed May 24, 2013.

* cited by examiner

METHOD OF MANUFACTURING AN ELECTRODE, CORRESPONDING ELECTRODE AND BATTERY COMPRISING SUCH AN ELECTRODE

The present invention relates to devices for the storage of energy or batteries, and more particularly, the electrodes of batteries.

Thanks to their high energy density, lithium-ion batteries have become widely available in the field of batteries and notably allow the development of electric vehicles to be envisioned offering a greater autonomy beyond 200 km.

The energy density of a battery depends on two quantities: on the one hand, the electrochemical potential difference (electromotive force) between the positive (cathode) and negative (anode) electrodes and, on the other hand, the capacity, namely the number of charges (mA·h) able to be stored in each of the electrodes. Currently, the energy density of commercial lithium-ion batteries is severely limited by the capacity of the positive electrode. The latter is typically less than 160 mAh/g, which is around half compared to the capacity of the negative electrode. As a consequence, the weight of the material of the positive electrode in a lithium-ion battery is at least twice that of the material of the negative electrode.

Amongst the materials of the positive electrode, it is sulfur that offers the highest specific capacity: 1673 mAh/g. This value, ten times higher than those of the materials currently used, allows a very significant increase in the energy density of the batteries to be envisioned: from 150-200 Wh/kg to 400-500 Wh/kg, despite the relatively low electrochemical potential of a sulfur-containing electrode. However, the employment of sulfur as electrode material poses two main problems:

1) sulfur forms soluble species with lithium: during the discharge, the lithium reacts with the sulfur and forms intermediate species of the $Li_xS_y$ type which are soluble in the electrolyte. The solubilization of these species leads to an irreversible loss of the capacity of the electrode and hence of the energy density during charge/discharge cycles;

2) sulfur is an electrical insulator: this property greatly limits the possibilities of batteries using sulfur in terms of electrical power.

It is possible to limit the dissolution of sulfur in the electrolyte by imprisoning sulfur in the pores of carbon-containing materials. Such a structure allows a high electrode capacity (700 mAh/g) to be maintained for 150 cycles. However, sulfur is only partially trapped in the pores because a direct interface with the electrolyte still subsists.

In order to overcome the poor electrical conductivity of sulfur, it is possible to deposit the latter on a nanostructured collector composed of aligned carbon nanotubes. Such a disposition allows, on the one hand, the diffusion lengths of the electrons (which are in motion during the charges/discharges) to be limited by virtue of the nanometric dimensions of the sulfur present on the surface of the aligned carbon nanotubes. Furthermore, the carbon nanotubes are good electrical conductors, a fact which allows a high electrical conductivity to be provided between the sulfur and the collector situated at the base of the carbon nanotubes.

Examples of aligned carbon nanotubes used as a substrate for sulfur are described in the documents US 2011/0262807 and US 20011/0091773. However, for these two patent applications, the carbon nanotubes obtained are synthesized by plasma-assisted (enhanced) chemical vapor deposition (PECVD), which leads to limitations on the characteristics of the synthesized nanotubes. More particularly, the carbon nanotubes have a relatively low density due to their relatively large diameter (typically greater than 20 nm), a fact which increases the quantity, and hence the thickness, of sulfur per unit of surface area so as to be able to increase the capacity of the electrode, and hence leads to a reduction in the electrical conduction of the electrode. In addition, the carbon nanotubes formed by PECVD generally exhibit a poor crystalline quality, which also endows them with a lower electrical conductivity. Lastly, PECVD processes do not allow self-orienting carbon nanotubes to be produced with a length greater than 20 µm, which implies limitations in terms of surface capacity of the electrode (stored charge per unit of surface area: $mAh/cm^2$).

The aim of the present invention is to solve the aforementioned technical problems. In particular, one object of the invention is a method for the preparation of an electrode allowing a high electrical conductivity to be obtained. A further object of the invention is to obtain an electrode exhibiting a high specific surface area. A further object of the invention is to obtain an electrode exhibiting a long durability, in other words an electrode capable of exhibiting a substantially constant capacity after several charge-discharge cycles.

According to one aspect, a method is provided for fabricating a sulfur-containing electrode for an energy storage device, notably for a lithium-ion battery, comprising the following steps:

a) a deposition of catalytic growth seeds, for example of iron, onto an electrically-conducting substrate, for example made of aluminum, by aerosol spraying, b) a growth, for example by CVD (chemical vapor deposition), of oriented carbon nanotubes starting from the deposition of catalytic growth seeds, c) a deposition of sulfur onto the oriented carbon nanotubes formed in the step b), for example by aerosol spraying, and d) a deposition of a layer of carbon, preferably graphite, onto the sulfur, after the step c).

The aerosol spraying, or aerosol spray, is a method of deposition of a material by projection (or atomization) of fine droplets (or microdroplets) carried by a carrier gas. Such a method offers the advantage of being easily industrialized and low cost, and allows the use of more complicated processes to be avoided, such as PVD (physical vapor deposition) which requires a high vacuum to be created.

The deposition of growth seeds onto the electrically-conducting substrate by the method of aerosol spraying allows, during the step b), long carbon nanotubes to be obtained that are oriented and of small diameter. Oriented nanotubes are understood to mean nanotubes having an angle with respect to the surface of the substrate in the range between 80° and 100°, preferably equal to or substantially equal to 90°. Each oriented carbon nanotube may be composed of one or more concentric cylinders. The oriented carbon nanotubes have a length greater than 20 µm, preferably greater than 50 µm, and more preferably greater than 100 µm. They also have a diameter of less than 20 nm, preferably less than 15 nm, more preferably less than 10 nm, and even more preferably less than 5 nm. The oriented carbon nanotubes may be spaced from one another by 10 to 100 nm. It is thus possible to obtain a high density of carbon nanotubes, which leads, with the long length of the nanotubes, to a high areal density. The thickness of sulfur deposited onto the surface of the carbon nanotubes can then be reduced, which reduces the limitations due to the low electrical conductivity of sulfur. Furthermore, the process of growth of the nanotubes (CVD) associated with the deposition of catalytic growth seeds onto the electrically-conducting substrate allows well-crystallized carbon nanotubes, and hence exhibiting a high electrical conductivity, to be obtained. More particularly, the step b) for growth of the nanotubes can comprise a chemical vapor deposition (CVD) with a hydrocarbon precursor whose hydrogen has been dissociated, for example by a hot filament.

The layer of graphitic carbon on the surface of the sulfur allows the sulfur deposited on the surface of the carbon nanotubes to be retained. More particularly, the layer of graphitic carbon can prevent the soluble species $Li_xS_y$, formed during the charge/discharge cycles, from being irreversibly lost into the electrolyte. The layer of graphitic carbon thus allows the capacity of the electrode to be maintained over time.

According to one embodiment, the electrically-conducting substrate is an aluminum substrate.

According to another embodiment, prior to the step a), a layer of aluminum is deposited, for example by a physical vapor deposition (PVD), onto a substrate in order to form the electrically-conducting substrate.

Preferably, between the step c) and the step d), a step for heating the electrode is carried out in order to melt the sulfur on the surface of the carbon nanotubes. Such a step allows a layer of sulfur to be obtained that is relatively uniform in thickness over the whole surface of the carbon nanotubes.

The invention also relates to a sulfur-containing electrode obtained by the implementation of the previously-defined fabrication method, together with a storage device, notably a lithium-ion battery, comprising a sulfur-containing electrode such as previously defined as a cathode.

The invention also relates, according to another aspect, to a sulfur-containing electrode for an energy storage device, notably for a lithium-ion battery, comprising an electrically-conducting substrate, for example made of aluminum, and oriented carbon nanotubes disposed on the surface of the electrically-conducting substrate and covered, at least in part, by sulfur, the sulfur covering the carbon nanotubes having a free surface area covered by a layer of carbon, preferably graphite. In other words, the electrode comprises an electrically-conducting substrate, oriented carbon nanotubes disposed on the surface of the substrate, and a sulfur-containing coating over all or part of the carbon nanotubes.

Oriented nanotubes are understood to mean nanotubes having an angle with respect to the surface of the substrate in the range between 80° and 100°, preferably equal to or substantially equal to 90°. Each oriented carbon nanotube may be composed of one or more concentric cylinders.

In particular, the oriented carbon nanotubes have a length greater than 20 µm, preferably greater than 50 µm, and more preferably greater than 100 µm.

Preferably, the oriented carbon nanotubes have a diameter less than 20 nm, preferably less than 15 nm, more preferably less than 10 nm, and even more preferably less than 5 nm.

The oriented carbon nanotubes may be spaced apart from one another by 10 to 100 nm.

The electrically-conducting substrate may consist of an aluminum substrate or may comprise a substrate made of stainless steel covered by a layer of aluminum.

The invention lastly relates to a battery, notably lithium-ion, comprising a sulfur-containing electrode, in particular a cathode, such as previously described.

Other advantages and features of the invention will become apparent upon examining the detailed description of one non-limiting embodiment and the appended drawings in which FIGS. 1 to 6 illustrate schematically the main fabrication steps for a portion of electrode according to the invention. It will be noted that the elements shown in the figures are very greatly enlarged in order to facilitate the understanding.

FIG. 1 shows a cross-sectional view of a substrate 1 on which carbon/sulfur nanotubes will be fabricated in order to form a portion of electrode of a battery. The substrate 1 can comprise or be composed of a metal sheet with a thickness in the range between 10 µm and 50 µm. The substrate 1 can be composed of a sheet of aluminum, of copper, of nickel, of stainless steel or of a sheet of another equivalent material. In the following part of the description, it is considered that the substrate 1 is made of stainless steel.

Figure 2:
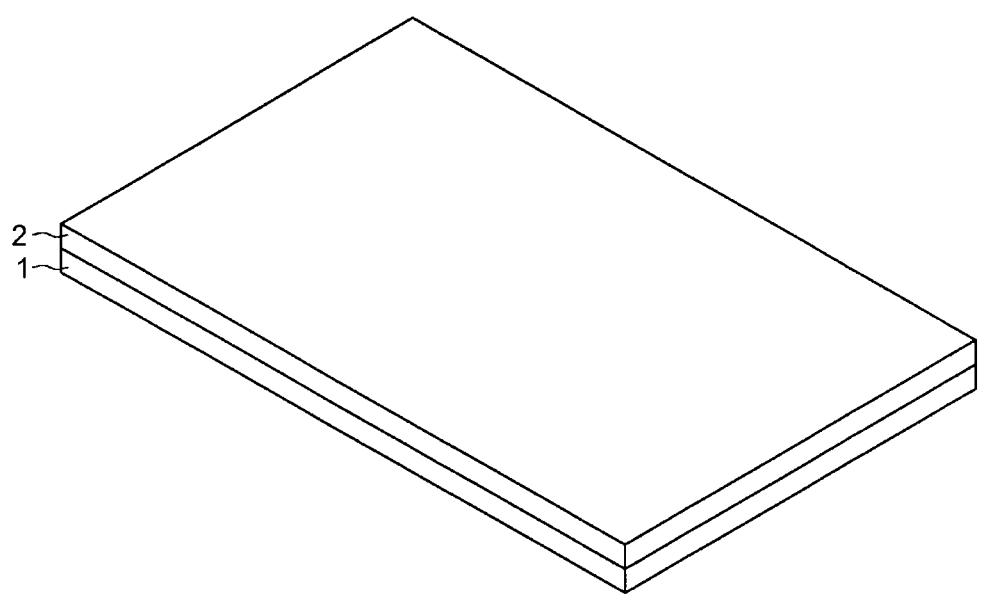

FIG. 2 shows a first step of the method for formation of the carbon/sulfur nanotubes, in the case where the substrate 1 is made of stainless steel. The first step of the method then comprises the deposition of a layer 2 of aluminum onto the surface of the substrate 1. The aluminum of the thin layer 2 forms a barrier layer for the species which will be deposited in the following steps of the method, and also allows the catalytic seeds deposited later to be stabilized. It will be noted that the step illustrated in FIG. 1 may be eliminated when the substrate is made of aluminum.

Figure 3:
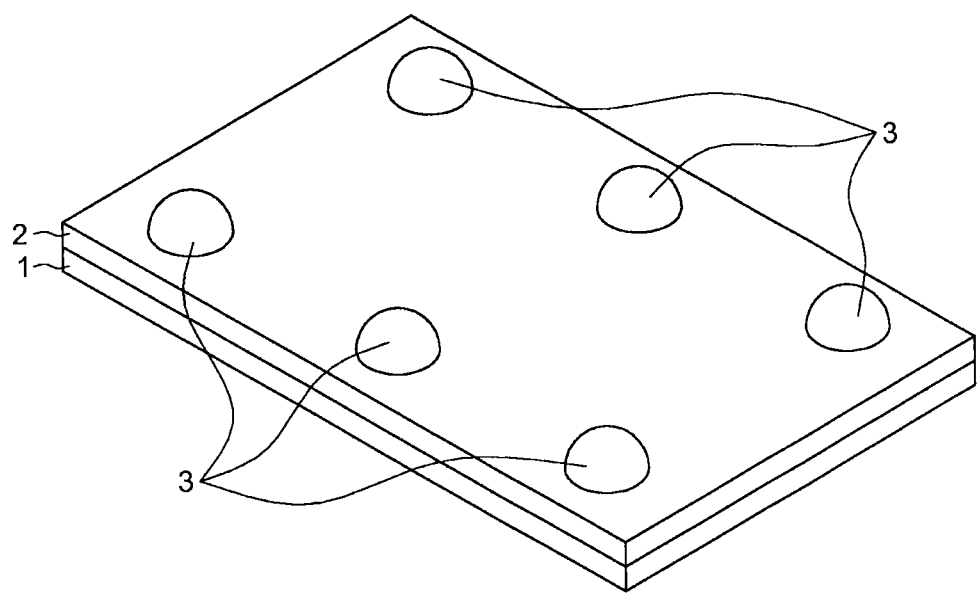

In a third step shown in FIG. 3, catalytic growth seeds 3 are deposited onto the surface of the layer 2. The catalytic growth seeds 3 may comprise iron chloride, and allow the growth of the oriented carbon nanotubes to be catalyzed: more particularly, the carbon nanotubes will grow starting from the catalytic seeds. The catalytic growth seeds can be deposited by aerosol spray. For this purpose, an atomized solution of iron chloride in ethanol may be used in the form of micrometer-sized droplets, then carried by a flow of nitrogen toward the surface of the layer 2. The microdroplets which then come into contact with the surface of the layer 2 then instantaneously evaporate and lead to the deposition of the catalytic growth seeds 3 on the surface of the layer 2. By virtue of the layer 2 of aluminum, an enhanced stabilization of the catalytic seeds 3 of iron is obtained prior to the growth of the carbon nanotubes.

Figure 4:
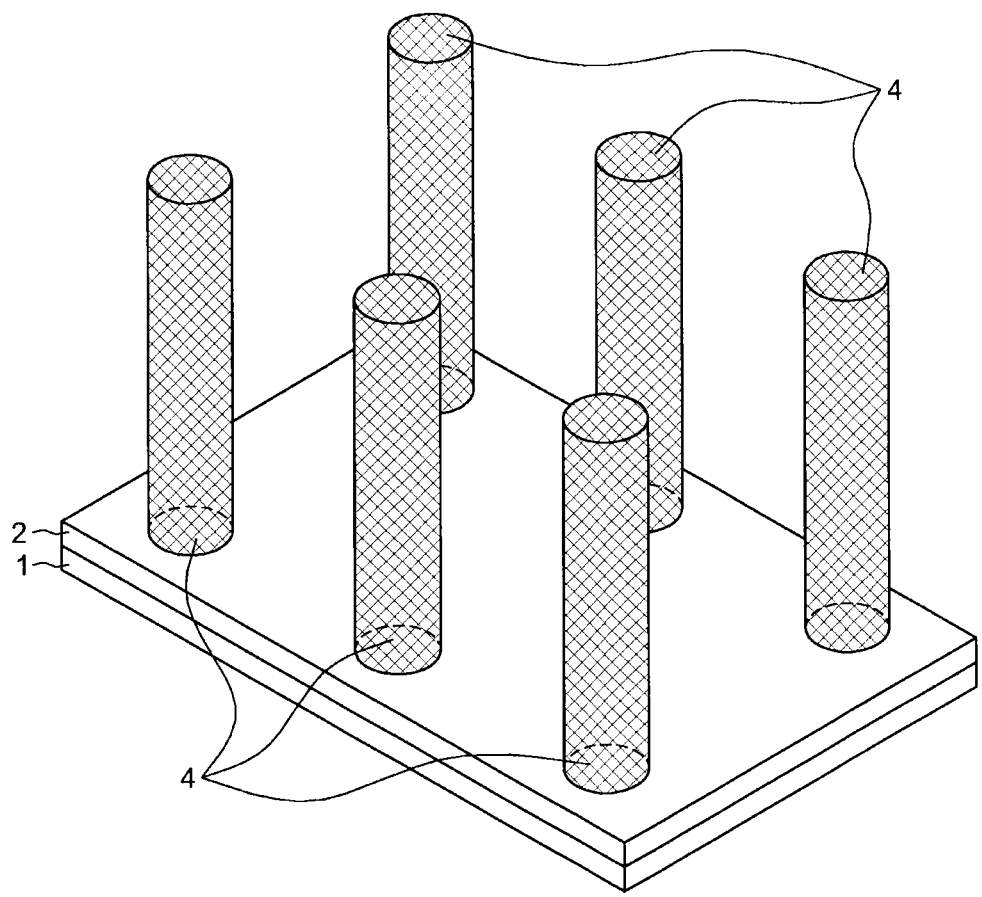

In a fourth step shown in FIG. 4, the growth of oriented carbon nanotubes 4 is carried out on the layer 2. The synthesis of the nanotubes is achieved by growth starting from the catalytic seeds 3. The carbon nanotubes are thus formed by chemical vapor deposition (CVD) by means of a hydrocarbon precursor. In order to achieve the synthesis of the carbon nanotubes 4 at temperatures below 660° C. (which is the temperature of fusion of aluminum), the hydrogen from the hydrocarbon precursor is dissociated upstream of the substrate. The presence of the layer of aluminum as a substrate allows the iron to be organized in the form of nanoparticles for the synthesis of oriented carbon nanotubes 4. The aligned carbon nanotubes 4 obtained after synthesis then have a diameter of around 5 nm and a length greater than 20 µm, for example between 20 µm and 200 µm, which leads to a large specific surface area together with a good electrical conductivity.

Figure 5:
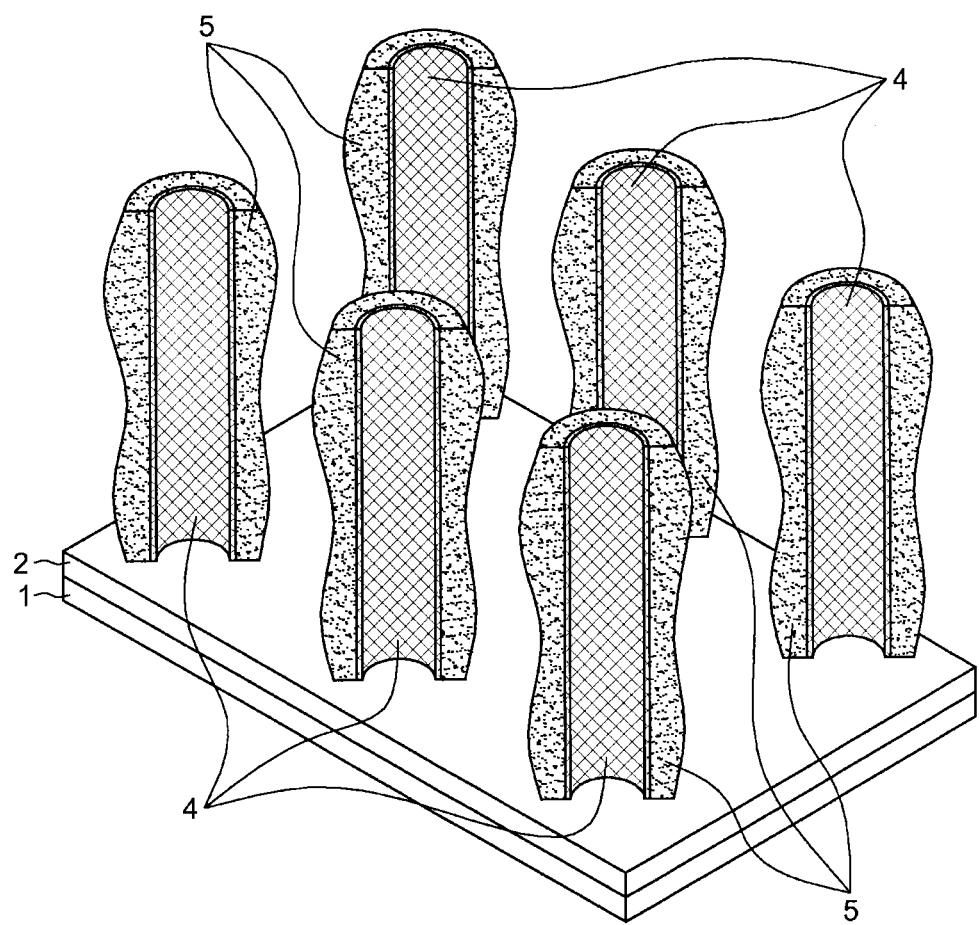

Then, as illustrated in FIG. 5, a deposition of sulfur 5 is carried out on the carbon nanotubes 4. In FIG. 5, the carbon nanotubes 4 have been shown in cross section in order to better illustrate the deposition of sulfur 5 on their surface. Advantageously, this deposition of sulfur 5 is carried out by aerosol spray of a solution of sulfur, in a similar manner to the deposition of the layer of iron chloride 3 on the layer 2. Once the deposition of sulfur 5 has been carried out, the whole assembly can be heated, for example to a temperature of 150° C., in order to melt the deposited sulfur and to thus coat the walls of the carbon nanotubes 4.

Figure 6:
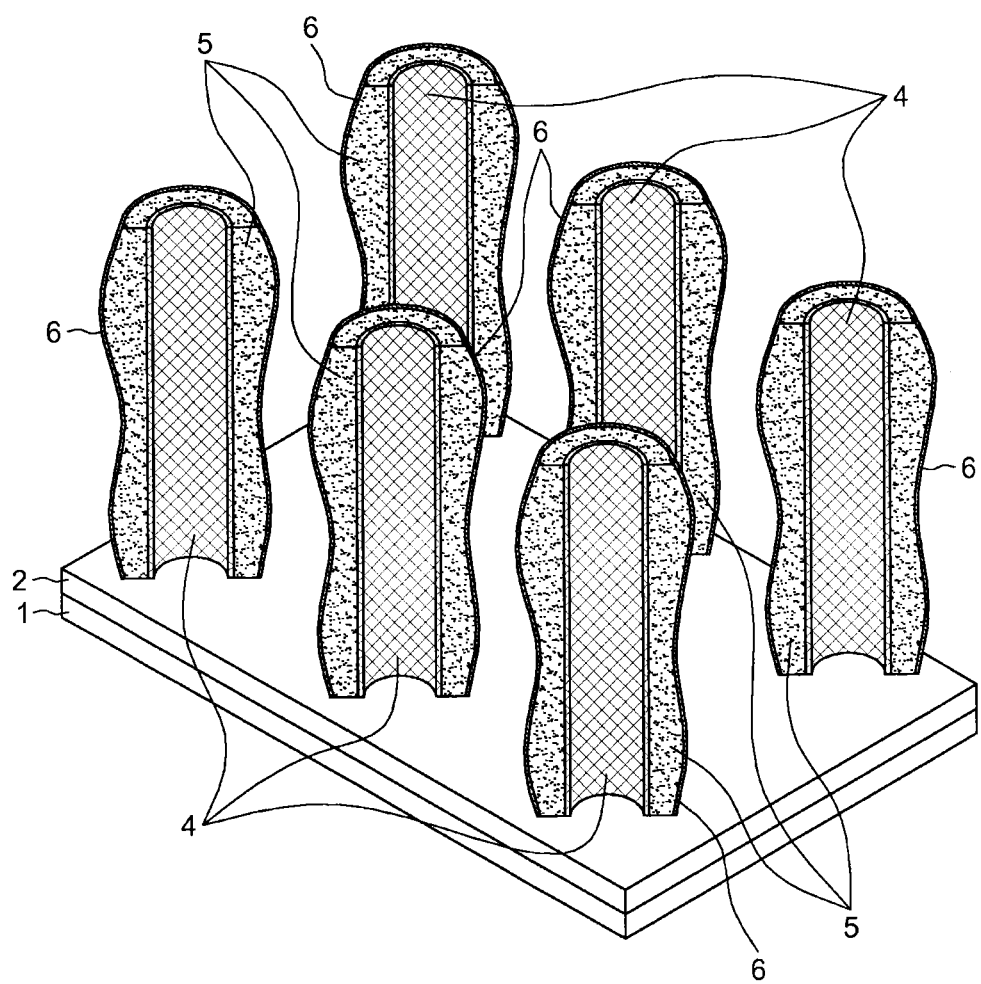

Finally, as illustrated in FIG. 6 where the carbon nanotubes 4 are also shown in cross section, a layer of graphitic carbon 6 is deposited onto the sulfur 5. The deposition is carried out at a temperature below 450° C., which corresponds to the boiling point of sulfur, in order to conserve the integrity of the layer of sulfur 5. The graphitic carbon is deposited for example by plasma-enhanced vapor deposition (PECVD), under a reduced pressure of 2 mbar of a hydrocarbon gas, for example methane, acetylene or, more advantageously, a mixture of ethanol and isopropanol.

Thus, a portion of electrode is obtained comprising oriented carbon nanotubes covered with sulfur and with graphite and disposed on an aluminum substrate. By virtue of the length and the density of the carbon nanotubes, the layer of sulfur deposited on the latter can be thin, while at the same time conserving overall a large quantity of sulfur within the electrode: consequently, a large specific surface area is obtained. Such an electrode therefore allows the desired electrical properties to be obtained, notably in terms of electrical conductivity and density, for an application in a lithium-ion battery. The lithium-ion battery can thus comprise a cathode, such as previously defined, and an anode which are connected via an electrolyte.

EXAMPLE

One exemplary embodiment of the method has been implemented with the following parameters. In this example, the electrically-conducting substrate comprises a substrate made of stainless steel 1 and a layer of aluminum 2. The thin layer of aluminum 2 has a thickness of 30 nm and is deposited onto the substrate 1, by physical vapor deposition by means of an evaporator.

The catalytic growth seeds 3 are deposited onto the layer of aluminum 2. For this purpose, a solution of iron chloride is prepared by solubilization of $FeCl_3 \cdot 6H_2O$ in ethanol, to a concentration in the range between $5 \cdot 10^{-2}$ mol·L$^{-1}$ and $5 \cdot 10^{-4}$. The solution of iron chloride is then atomized in the form of micrometer-sized droplets by means of an atomization valve with a flow rate equal to 2 mL·min$^{-1}$, then is carried by a flow of nitrogen toward the surface of the layer of aluminum 2 placed at a distance of around 11 cm and heated to a temperature of 120° C. The quantity of solution of iron chloride atomized is 30 mL for a sample surface area of 80 by 80 mm$^2$.

The synthesis of the carbon nanotubes 4 is subsequently carried out by chemical vapor deposition (CVD) at 600° C. by means of a precursor mixture $CH_4/H_2$ (50:50). The pressure in the CVD reactor is fixed at 50 mbar and the total gas flow at 100 sccm (standard cubic centimeters per minute). A hot filament of tungsten having a power of 205 W is used for dissociating, upstream, the hydrogen and the methane.

The coating of sulfur 5 is then deposited on the carbon nanotubes 4. The solution of sulfur used for the deposition is a solution of sulfur at 1% by weight dissolved in toluene, and is atomized by aerosol spray onto the carbon nanotubes 4.

Lastly, the graphitic carbon is deposited by plasma-enhanced vapor deposition (PECVD) in which the plasma is a DC discharge with a power of 100 W. The deposition is carried out at a temperature of 400° C., under a reduced pressure of 2 mbar of a mixture of ethanol and isopropanol.

An electrode exhibiting the desired electrical properties and designed for use in a lithium-ion battery is thus obtained.

The invention claimed is:

1. A method for fabricating an electrode, comprising:
    a) aerosol spraying a plurality of catalytic growth seeds onto an electrically-conducting substrate,
    b) growing a plurality of oriented carbon nanotubes, each of the oriented carbon nanotubes starting from a respective one of said catalytic growth seeds,
    c) depositing sulfur onto each of the oriented carbon nanotubes formed in the step b), and
    d) depositing a layer of carbon onto the sulfur of each respective oriented carbon nanotube, after the step c).

2. The method as claimed in claim 1, wherein the electrically-conducting substrate is an aluminum substrate.

3. The method as claimed in claim 1, wherein prior to the step a), a layer of aluminum is deposited onto a substrate in order to form the electrically-conducting substrate.

4. The method as claimed in claim 1, wherein between the step c) and the step d), heating the electrode such that the sulfur melts on the surface of the carbon nanotubes.

* * * * *